US007077892B2

(12) United States Patent
Lee

(10) Patent No.: US 7,077,892 B2
(45) Date of Patent: Jul. 18, 2006

(54) AIR PURIFICATION SYSTEM AND METHOD

(76) Inventor: David B. Lee, 521 2nd Ave., San Bruno, CA (US) 94066

( * ) Notice: Subject to any disclaimer, the term of this patent is extended or adjusted under 35 U.S.C. 154(b) by 57 days.

(21) Appl. No.: 10/862,364

(22) Filed: Jun. 8, 2004

(65) Prior Publication Data

US 2005/0109209 A1    May 26, 2005

Related U.S. Application Data

(60) Provisional application No. 60/524,851, filed on Nov. 26, 2003.

(51) Int. Cl.
*B01D 53/14* (2006.01)

(52) U.S. Cl. .................... 96/250; 96/313; 55/434.4; 55/459.1

(58) Field of Classification Search ............... 96/205, 96/209, 249, 250, 306, 311, 313, 321, 356, 96/357, 360; 55/434.2, 434.3, 434.4, 459.1; 95/219, 228
See application file for complete search history.

(56) References Cited

U.S. PATENT DOCUMENTS

| 1,822,221 | A | * | 9/1931 | Jones | 241/17 |
|---|---|---|---|---|---|
| 2,604,185 | A | * | 7/1952 | Anthony, Jr. et al. | 95/219 |
| 3,824,767 | A | * | 7/1974 | Ford | 95/288 |
| 3,854,300 | A | * | 12/1974 | Gerhold | 62/88 |
| 3,912,469 | A | * | 10/1975 | Ewan et al. | 96/311 |
| 3,925,040 | A | * | 12/1975 | Fattinger | 96/356 |
| 4,913,711 | A | * | 4/1990 | Stewart | 55/434.1 |
| 5,230,166 | A | * | 7/1993 | Deng | 55/434.4 |
| 5,413,626 | A | * | 5/1995 | Bartsch | 95/219 |
| 6,059,866 | A | | 5/2000 | Yamagata et al. | |
| 6,228,148 | B1 | | 5/2001 | Aaltonen et al. | |
| 6,503,302 | B1 | | 1/2003 | Wong | |

FOREIGN PATENT DOCUMENTS

JP     7096122    4/1995

* cited by examiner

*Primary Examiner*—Frank M. Lawrence

(57) ABSTRACT

The air purification system and method for purifying and cooling air for use in a building has an air pollutant removal stage, an air pre-cooling unit, and a dual cooling and water removal unit, including a cyclone separator having a cooling coil wrapped around the separator for condensing and removing water from the airflow. The method comprises the steps of removing pollutants from an incoming polluted airflow to provide a substantially pollutant free outgoing moist airflow; pre-cooling the substantially pollutant free moist airflow to provide a clean cool moist airflow; and condensing water out of the clean cool moist airflow to provide a substantially clean dry airflow suitable for use in a building.

12 Claims, 11 Drawing Sheets

AIR PURIFICATION SYSTEM AND METHOD

CROSS-REFERENCE TO RELATED APPLICATION

This application claims the benefit of U.S. Provisional Patent Application Ser. No. 60/524,851, filed Nov. 26, 2003.

BACKGROUND OF THE INVENTION

1. Field of the Invention

The present invention relates to an air purification system and method. More specifically, the invention is directed to an air conditioning system and method that has an air pollutant removal stage, a pre-cooling stage, and a dual cooling and water removal stage.

2. Description of the Related Art

Air quality has become a serious health and life-style issue. There is a plethora of sources of pollution including, but not limited to: large trucks with diesel engines (source for, e.g., particulate matter, hydrocarbons, and carbon monoxide), gasoline driven vehicles (carbon monoxide, sulfur oxides (SOX), hydrocarbons, aircraft engines (carbon monoxide, and hydrocarbons such as benzene), and coal fired power stations (SOX and particulates). Rural areas can also suffer from pollution. For example, rural areas along coastlines may be subjected to pollution from oil refineries and other coastal facilities devoted to processing or manufacturing chemicals. Thus, air pollution can be a serious problem in urban and rural areas.

U.S. Pat. No. 6,503,302, issued Jan. 7, 2003 to Wong, describes a domestic air purifier that includes a plurality of non-linear conduits through which room air is drawn and into which fluid is introduced to remove particulate matter from the air. A plurality of fluid spraying nozzles provides thorough mixing between air and fluid to maximize the removal of particulates from the air. The fluid circulates continuously from a reservoir through the nozzles and conduits back to the reservoir. Simple fluids, such as water, are preferably used, although disinfectants, deodorants and/or scents may be added to the fluid. The '302 device has numerous problems in use. The '302 device explicitly adds humidity to the cleaned air and, absent a humidity removal stage, the '302 device is not suitable for use in a humid location. In fact, the '302 patent explicitly states that the '302 device "may also serve as a humidifier" (column 4, lines 33–39) Thus, the '302 patent explicitly teaches away from the present invention which removes moisture from the cleaned air.

U.S. Pat. No. 6,228,148, issued May 8, 2001 to Aaltonen et al., describes a method and an apparatus for separating solid or drop-like particles from an airflow. Air is directed through a separator chamber between an ion generating means and a grounded collector surface, so that the particles are charged by the charging device and accumulate on the collector surface. The air flows along a substantially spiral path around the charging device in at least a part of the separator chamber to induce a centrifugal force so that at least a portion of the particles pass toward the grounded collector surface at the periphery of the chamber. A small flow of purified air flows downwardly in a central part of the separator chamber so that it washes the charging device in the separator chamber. The efficiency of the '148 device is dramatically impacted if the charging device is not maintained in a clean condition.

Japanese Patent Number 7-96,122, published Apr. 11, 1995, describes a water spray type air purifier equipped with a water spray chamber through which air-containing dust is passed from the upstream side to the downstream side, and a water spray device arranged in the water spray chamber. The water spray device comprises a plurality of nozzles for spraying water into the dusty air. The '122 device further comprises a water separator arranged on the downstream side of the water spray chamber. A partition plate is arranged along the flow direction of the dust-contaminated air and almost vertically in the water spray chamber. The direction of the water spray from the water spray device is made parallel to that of sprayed water with respect to the partition plate. The pressure of water spray from the water spray device is equalized to that of the sprayed water hitting against the partition plate. U.S. Pat. No. 6,059,866, issued to Yamagata et al., shows a device in FIG. 21 that appears to be identical to FIG. 1 of the Japanese '122 patent, and notes that the device does not provide for humidifying the air.

None of the above inventions and patents, taken either singly or in combination, is seen to describe the instant invention as claimed. Thus an air purification system and method solving the aforementioned problems is desired.

SUMMARY OF THE INVENTION

An air purification system and method of the present invention provides for purifying and cooling air for use in a building. The air purification system has an air pollutant removal unit, an air pre-cooling unit, and a dual cooling and water removal unit. The method comprises the steps of removing pollutants from an incoming polluted airflow to provide a substantially pollutant-free outgoing moist airflow; pre-cooling the substantially pollutant free moist airflow to provide a clean, cool, moist airflow; and condensing water out of the clean, cool, moist airflow to provide a substantially clean, dry airflow suitable for use in a building.

Accordingly, it is a principal object of the invention to provide substantially pollutant-free dry air for use in a building.

It is another object of the invention to provide an air purification system and method for providing cool, clean air for use in a facility that requires substantially dehydrated and purified cool air.

Still another object of the invention is to provide an air purification system and method meeting a specific air quality requirement, such as air purity, moisture content and air temperature range.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to an air purification system and method. More specifically, the invention is directed to an air purification system that has an air pollutant removal stage, an air pre-cooling unit, and a dual cooling and water removal unit.

Figure 2:
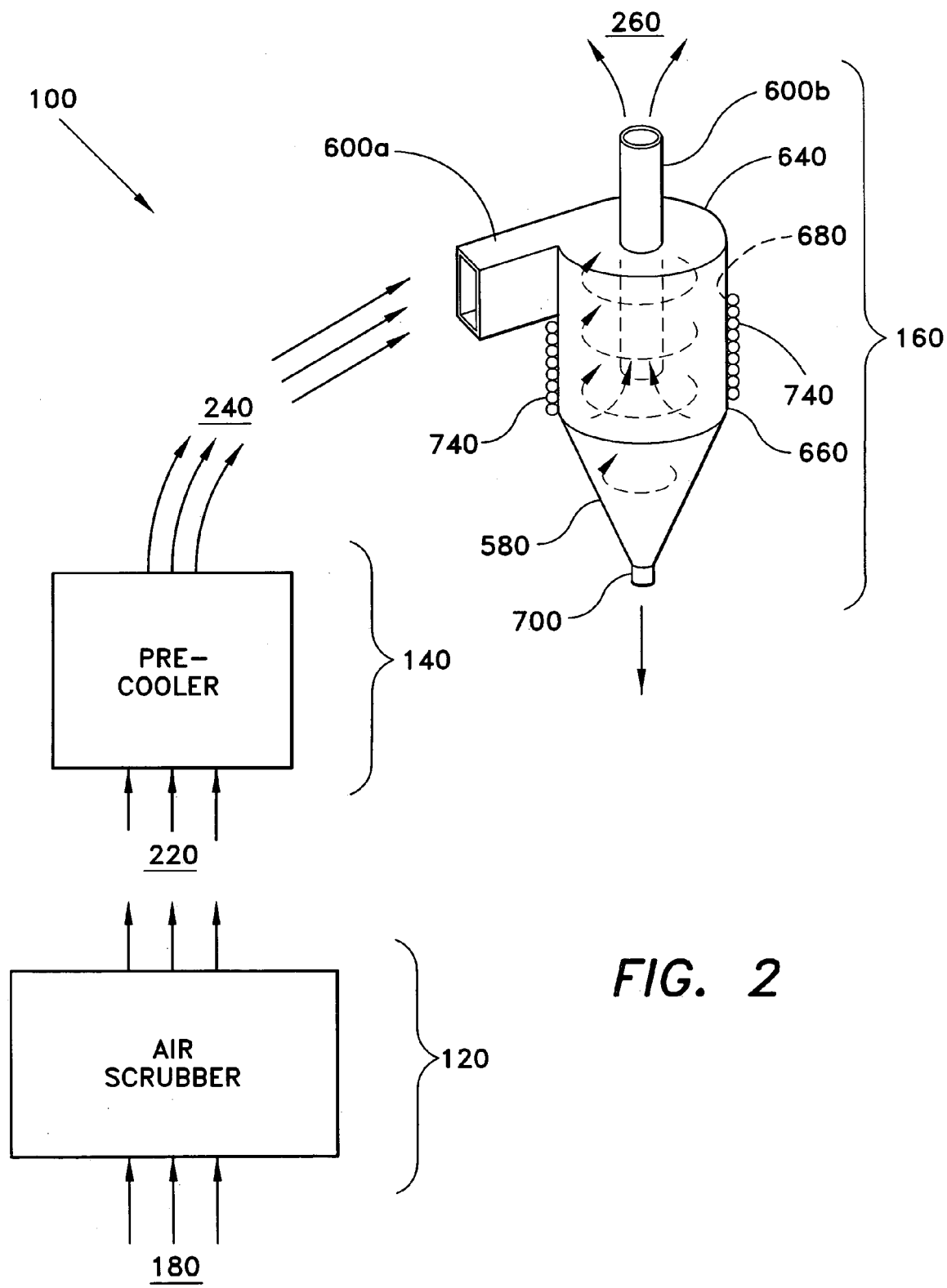
FIG. 2 is a schematic diagram showing how polluted air is processed by the air purification system according to the invention.

FIG. 2 is a schematic diagram showing how polluted air 180 is processed by the air purification system 100 according to the invention. Polluted air 180 is drawn and/or blown into an air pollutant removal stage 120 including an air scrubber where water is used to clean the air 180 to provide a substantially pollutant free outgoing moist airflow 220. The airflow 220 is directed to a pre-cooling stage 140 including a pre-cooler that cools the air 220 to provide a clean cool moist airflow 240. The airflow 240 is then directed to a dual cooling and water removal stage 160, which condenses water out of the airflow 240 to provide a substantially dehydrated and purified cold airflow 260 suitable for use in a building. Ducting is used where appropriate to direct the airflow through the air purification system 100.

Figure 1:
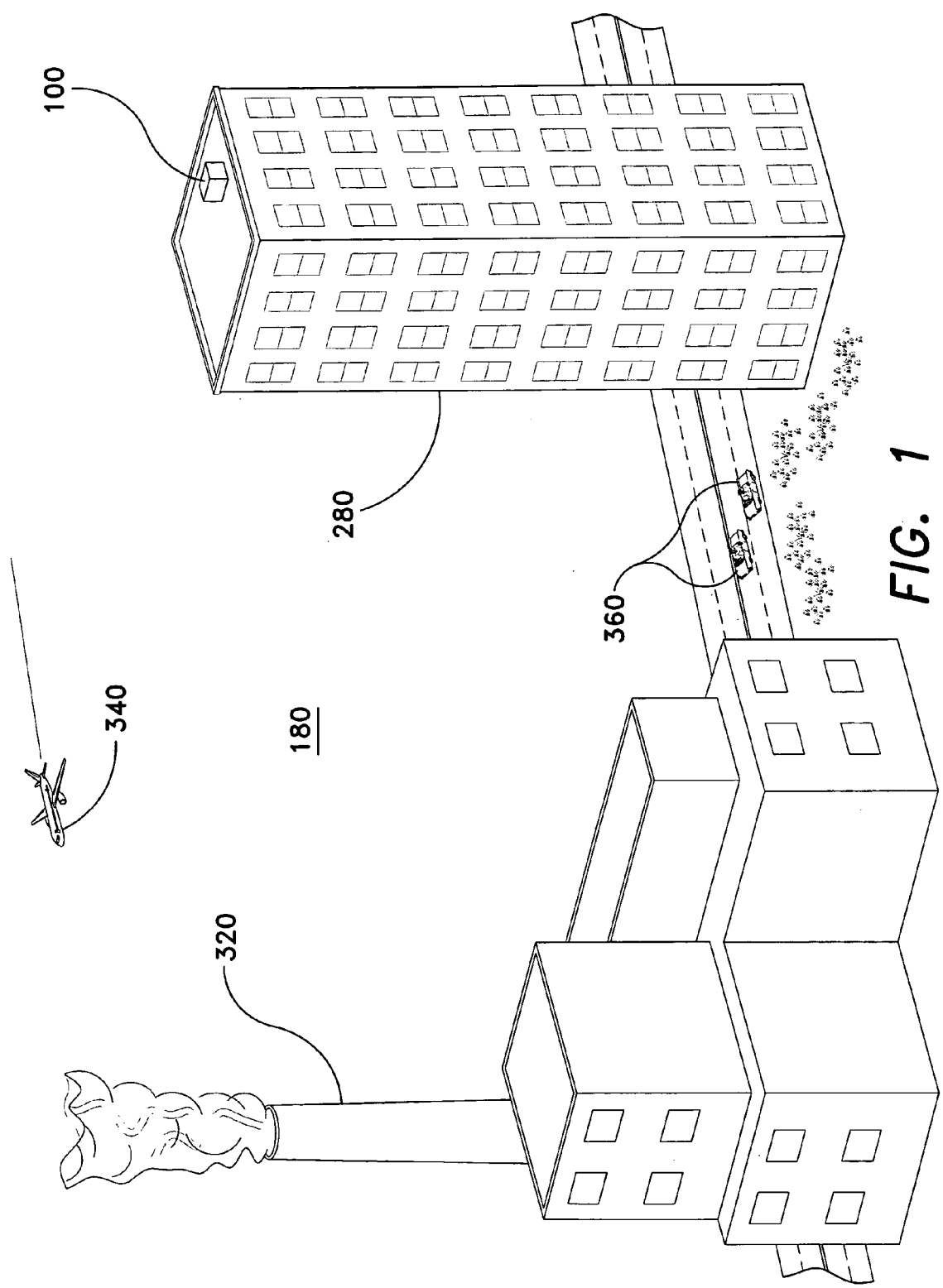
FIG. 1 is an environmental, perspective view of an air purification system according to the present invention.

As shown in FIG. 1, pollution sources, such as coal-fired power station stacks 320, aircraft engines 340, and vehicles 360, all contribute to generate polluted air 180. The air purification system 100 can be positioned at any suitable location, such as the top of a building 280. Polluted air 180 is cleaned, cooled, and dried for use in the building 280. The air purification system 100 can be used to provide a substantially dehydrated and purified cold airflow to satisfy any specific air quality requirements for any type of building, such as a domestic residence, office building, factory, cinema, hospital, research laboratory, and an electronic fabrication plant or factory.

Figure 3:
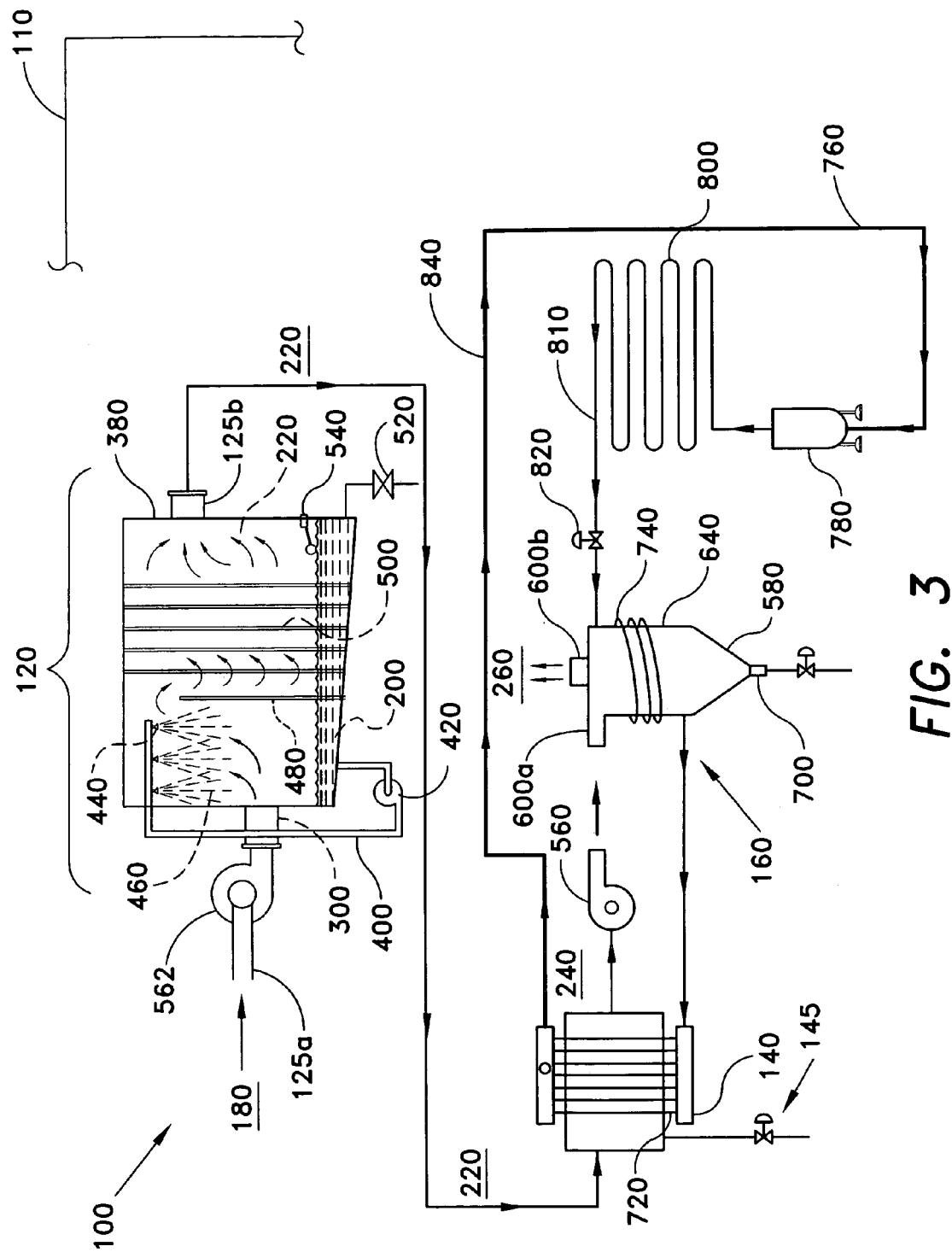
FIG. 3 is a diagrammatic view showing an air purification system according to the invention.

FIG. 3 shows the air purification system 100 in more detail. The system 100 is contained within housing 110. Polluted air 180 is drawn and/or blown into the air pollutant removal unit 120 by at least one air blower (or air pump) 562. The air pollutant removal unit 120 comprises a water spray type air scrubber or purifier with a water spray chamber 380 having an air inlet 125a, an air outlet 125b, and a water recirculation system 400. The water recirculation system 400 comprises a water pump 420, which circulates water 200 to a plurality of spray heads and/or nozzles 440 located inside the chamber 380. The spray nozzles 440 produce a water spray 460. The water spray 460 flows in a downward direction under the influence of gravity.

Still referring to FIG. 3, the polluted air 180 is directed upwardly against the flow of water spray 460 by an air dam 480. The air dam 480 extends vertically inside the chamber 380 and has a height that is at least half the height of the baffles 500. The water droplets in the water spray 460 remove pollutants from the air 180. The water spray 460 collects as a pool of water 200 in the bottom of the spray chamber 380, ready to be recirculated by the recirculation system 400. A plurality of water collection baffles 500 act as a scrubber to help remove excess moisture and water droplets. The air flows around baffles 500 and exits from the unit 120 as a substantially pollutant free outgoing moist airflow 220. The water collection baffles 500 are preferably arranged as shown in FIG. 10 in order to direct the airflow north-south (or east-west) across the baffles 500 to scrub and remove excess moisture and water droplets to generate a substantially pollutant free outgoing moist airflow 220.

Figure 10:
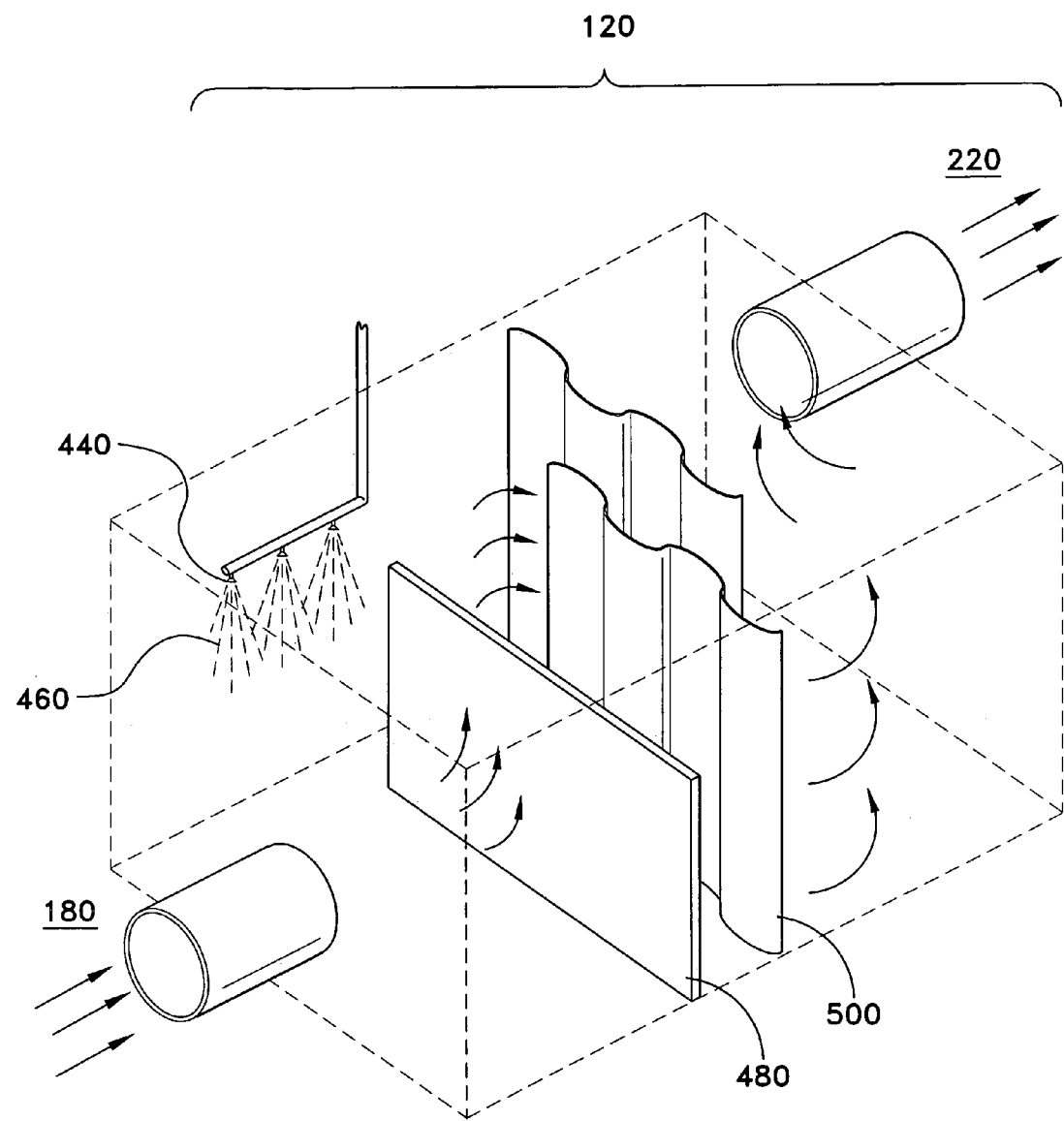
FIG. 10 is a diagrammatic view showing an air pollutant removal stage with water collection baffles that direct the airflow across the baffles.

Referring to FIG. 10, the baffles 500 extend vertically from the bottom to the top of the chamber 380 and are horizontally staggered to allow the polluted air 180 to move along the multiple curvatures of the baffles 500 for scrubbing the air. The baffles 500 may be corrugated or otherwise curved for creating a longer air path around the baffles 500, whereby the heavier moisture particles fall to the bottom by gravity.

Referring to FIGS. 2 and 3, the moist airflow 220 is directed to the air pre-cooling unit 140 where the air is pre-cooled to provide the clean cool moist airflow 240. The clean cool moist airflow 240 is directed to the dual cooling and water removal stage 160. The dual cooling and water removal stage 160 comprises a cyclone separator 580 having an air inlet 600a and outlet 600b. The air inlet 600a is configured to direct the airflow tangentially into the cyclone separator 580. The air outlet 600b has a centrally elongated tube partially extending interiorly of the cyclone separator 580 for allowing a substantially purified dry air 260 to exit through the outlet 600b.

The cyclone separator 580 further comprises a housing 640 having an exterior 660 and an interior 680 surface. Air directed into the cyclone separator 580 travels in a spiral fashion coming into contact with the interior surface 680, which is cooled to the condensation temperature of water by an evaporator coil 740 (discussed below). The cyclone separator 580 includes a condensed water discharge outlet 700 at the bottom of the housing 640.

Referring particularly to FIG. 3, the air purification system 100 comprises an integrated cooling system 760. The integrated cooling system 760 comprises a pre-cooler coil 720 and an evaporator coil 740 in series with respect to each other. The evaporator coil 740 is wrapped around the cyclone separator 580 and configured to cool the interior surface 680 therein. The pre-cooler coil 720 is disposed between the chamber outlet 125b and cyclone separator inlet 600a. Condensed water is removed from the pre-cooler 140 via outlet 145. At least one air blower (or air pump) 560 pulls the airflow 220 into the pre-cooler 140 while simultaneously pushing airflow 240 into the cyclone separator 580 via the cyclone separator air inlet 600a.

The integrated cooling system 760 also comprises a refrigerant compressor unit 780, a condenser section of tubing 800, a refrigerant expander or expansion valve 820, a high pressure refrigerant line 810, and a low pressure refrigerant line 840 to carry the lower pressure refrigerant back to the compressor unit 780. The condenser section of tubing 800 is used as a heat exchanger to dissipate the heat generated by the compressor unit 780 in condensing the refrigerant vapor into a liquid for recirculation. It should be understood that the exact arrangement of the integrated cooling system 760 could be varied.

In more detail, the compressor unit 780 acts as a pump to force the refrigerant into the condenser 800 to produce condensed (i.e., liquid) refrigerant that is directed along the refrigerant line 810 and into the evaporator coil 740, which forms part of the air cooling and water removal stage 160, via an expansion device 820 and is then forced into the pre-cooling coil 720, which forms part of the air pre-cooler 140. Refrigerant is returned to the compressor unit 780 via return line 840. Thus, the airflow 220 is pre-cooled by the cooling coil 720 to produce cooled airflow 240 that is directed into the cyclone separator 640 for final cooling by the refrigerant in the evaporator coil 740. At least one air pump (or air blower) 560 is used to direct the airflow through the air purification system 100.

Still referring to FIG. 3, the total dissolved solids (TDS) in the water 200 will tend to increase with time due to evaporation and in response to the amount of pollutants removed from the contaminant-carrying airflow 180. To keep the TDS level in a desirable range, a water bleed valve 520 is used to drain water 200. A conventional ballcock valve or float valve system 540, or its functional equivalent, is mounted to the chamber wall and adapted for attachment to an external water supply source or a water supply pipe (not shown) to provide make-up water and to maintain a desired water level in the pool.

Chlorine or other anti-bacterial agents may be added to the make-up water. Alternatively, the water 200 may be dosed with conventional water treatment chemicals, such as suitable biocides, to help control the level of bacteria, such as the causative agent of legionnaire's disease (*Legionella pneumophila*), in the water 200. For example, occasional use of a hypochlorite-based biocide in combination with a surfactant may be used to prevent biofilm buildup and keep bacterial counts at an acceptable level. However, sufficient professional care and advice should be taken prior to using such chemicals since inappropriate use may cause injuries such as skin burns and lung irritation. The water bleed valve 520 may be operated manually for a set period or automatically using a valve connected to a preset timer. The water bleed valve 520 may also be used to collect samples for routine water quality testing.

Figure 5:
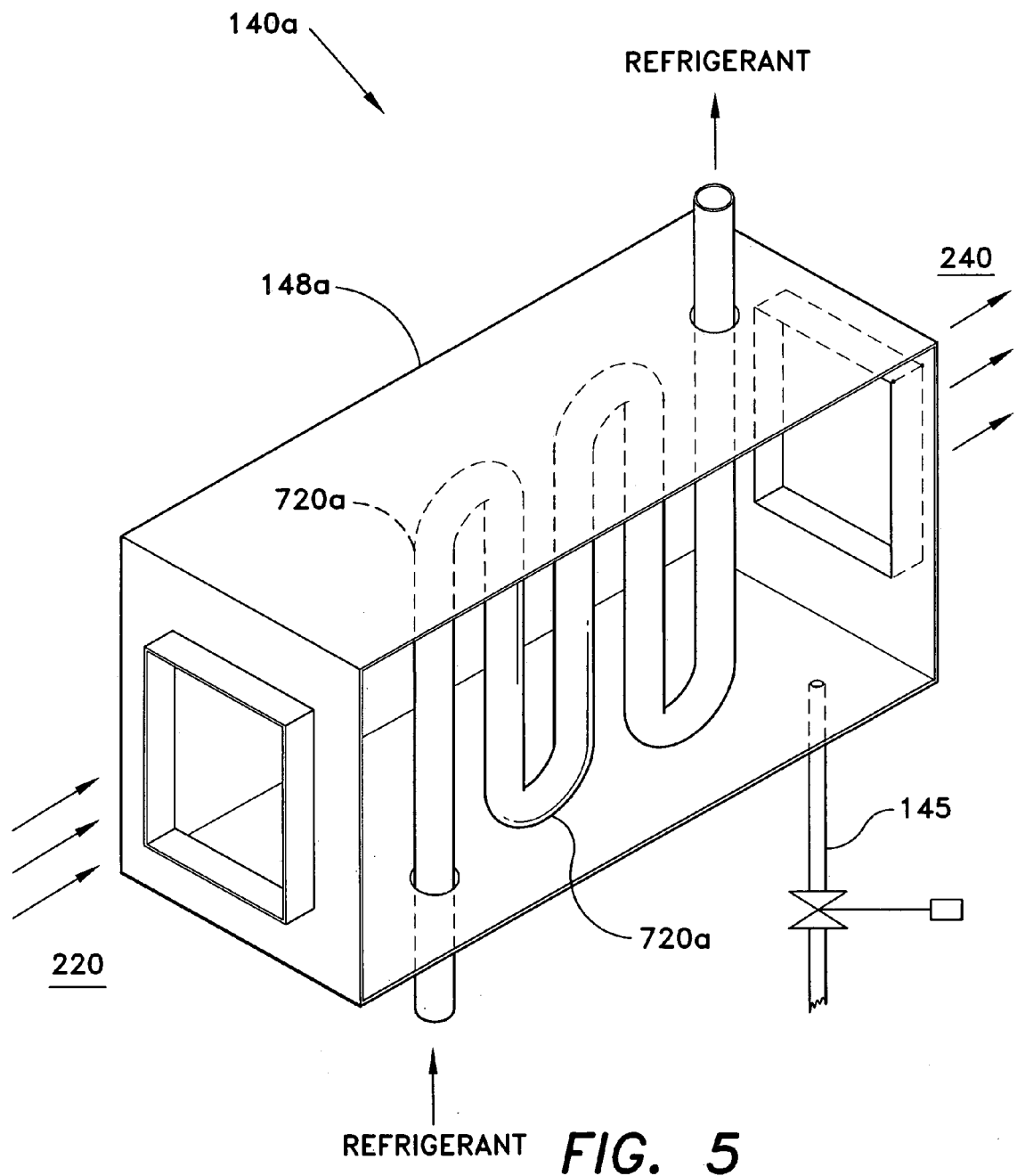
FIG. 5 is a diagrammatic view showing one variant of an air pre-cooler unit according to the invention.

FIG. 5 shows a variant of the air pre-cooler, designated as 140*a*. The air pre-cooler 140*a* comprises the pre-cooler coil 720*a* located in a housing 148*a*. Incoming airflow 220 passes through the housing 148*a* and is cooled by the coil 720*a* to provide outgoing airflow 240; any resulting condensate is disposed of via a condensate discharge line 145.

Figure 6:
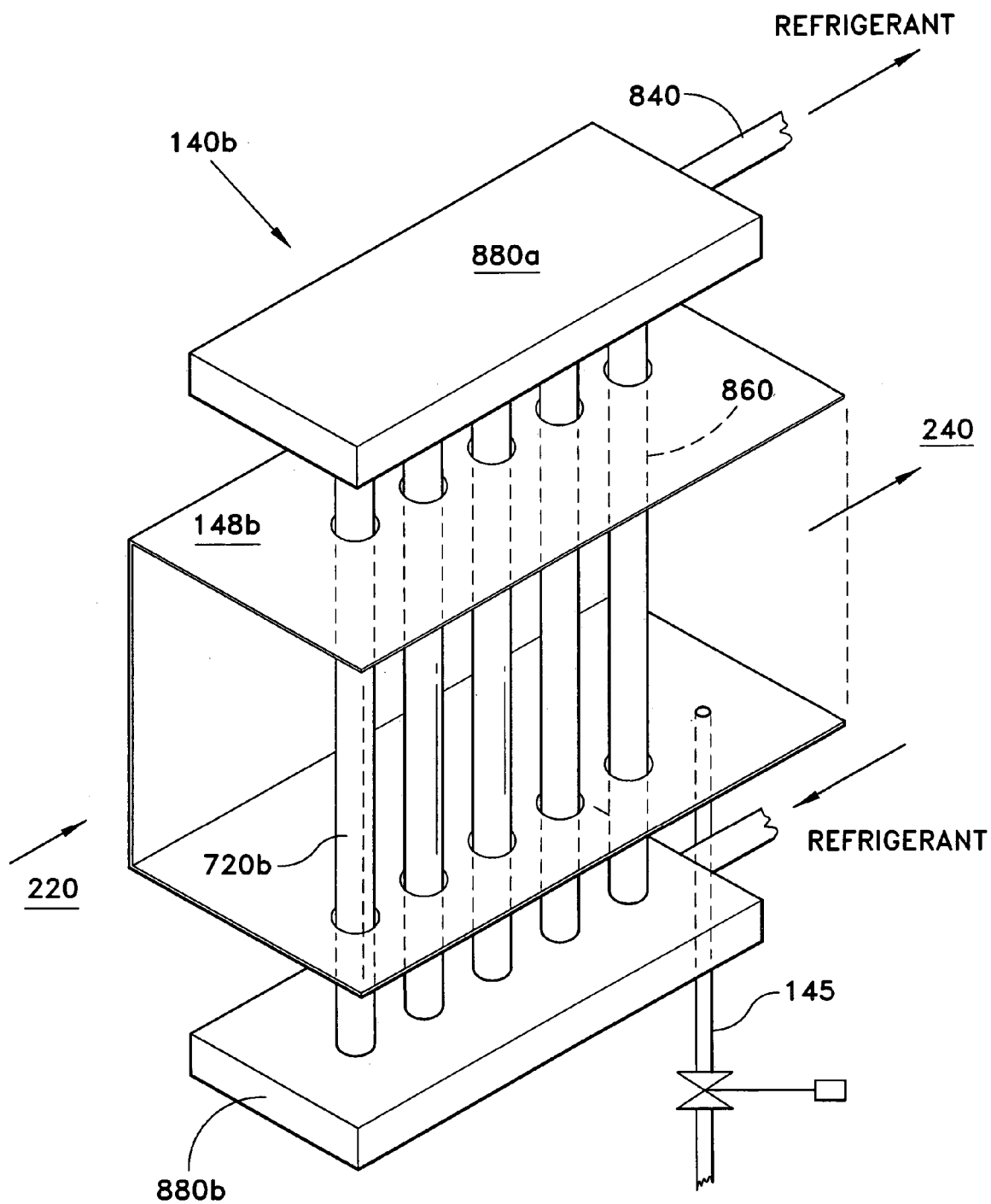
FIG. 6 is a diagrammatic view showing another version of an air pre-cooler unit according to the invention.

FIG. 6 shows a further variant of the air pre-cooler, designated as 140*b*. The air pre-cooler 140*b* comprises the pre-cooler coil 720*b* located in a housing 148*b*. Incoming airflow 220 passes through the housing 148*b* and is cooled by the coil 720*b* to provide outgoing airflow 240. The pre-cooler coil 720*b* is shown as a series of parallel tubes 860 in communication with an upper 880*a* and lower 880*b* manifold. Refrigerant flows into the lower manifold 880*b* and then through the tubes 860 and finally out through the upper manifold 880*a* into the return line section of the refrigerant line 840. It should be understood that the exact arrangement of the pre-cooler coil could vary.

Figure 7:
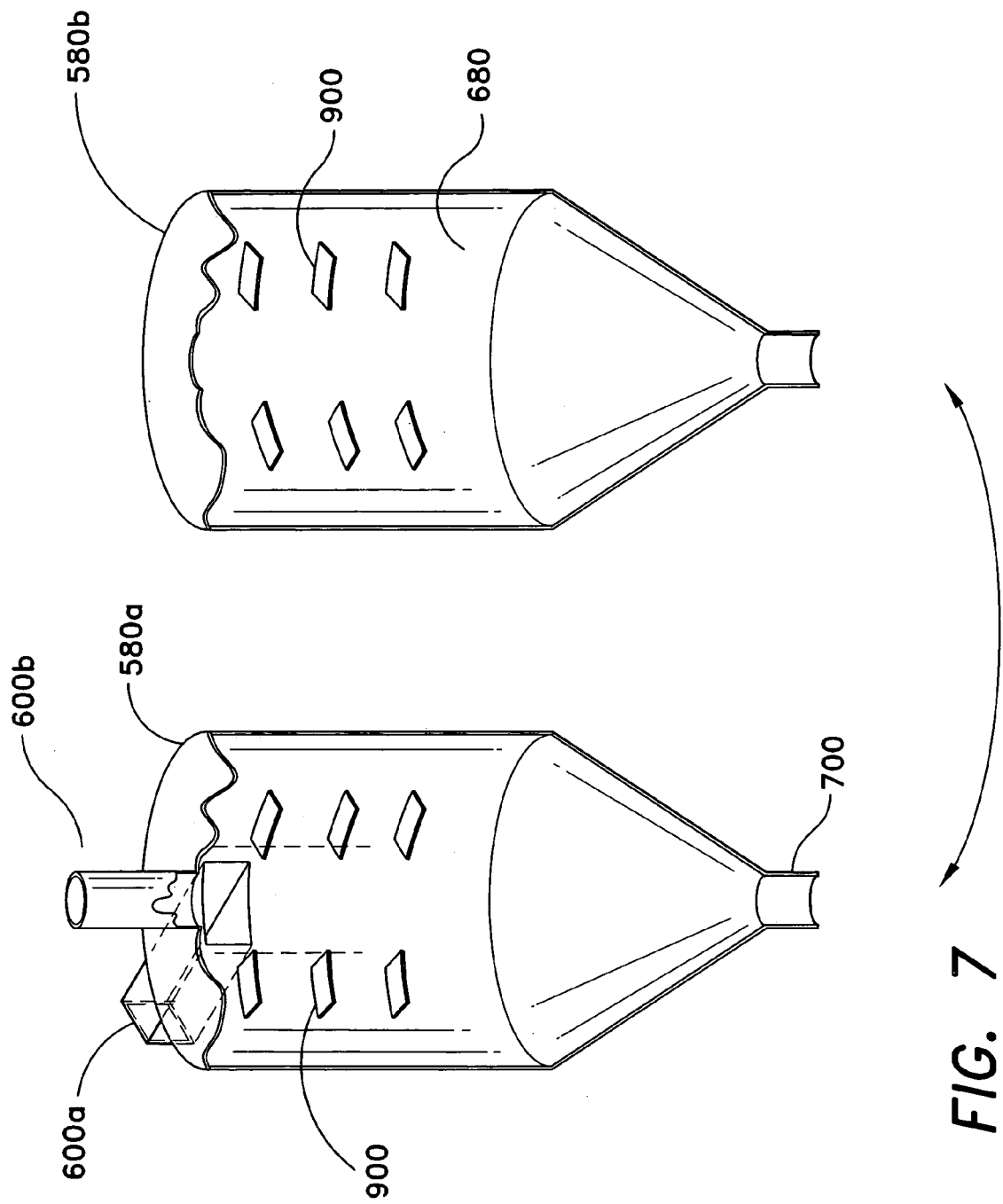
FIG. 7 is a diagrammatic view showing part of the dual cooling and water removal unit according to the invention.

FIG. 7 shows two sections 580*a* and 580*b* that can be welded together to provide the cyclone separator 580. Alternatively, a plurality of air fins 900 can be attached to the interior 680 to help direct the airflow in a spiral pattern inside the cyclone separator 580. The cyclone separator-cooling coil 740 is wrapped around the exterior 660 of the cyclone separator 580 to cool the interior surface 680, as shown in FIGS. 2 and 3. Preferably, the interior surface 680 of the cyclone separator 580 is chilled to the condensation temperature of water.

Figure 11:
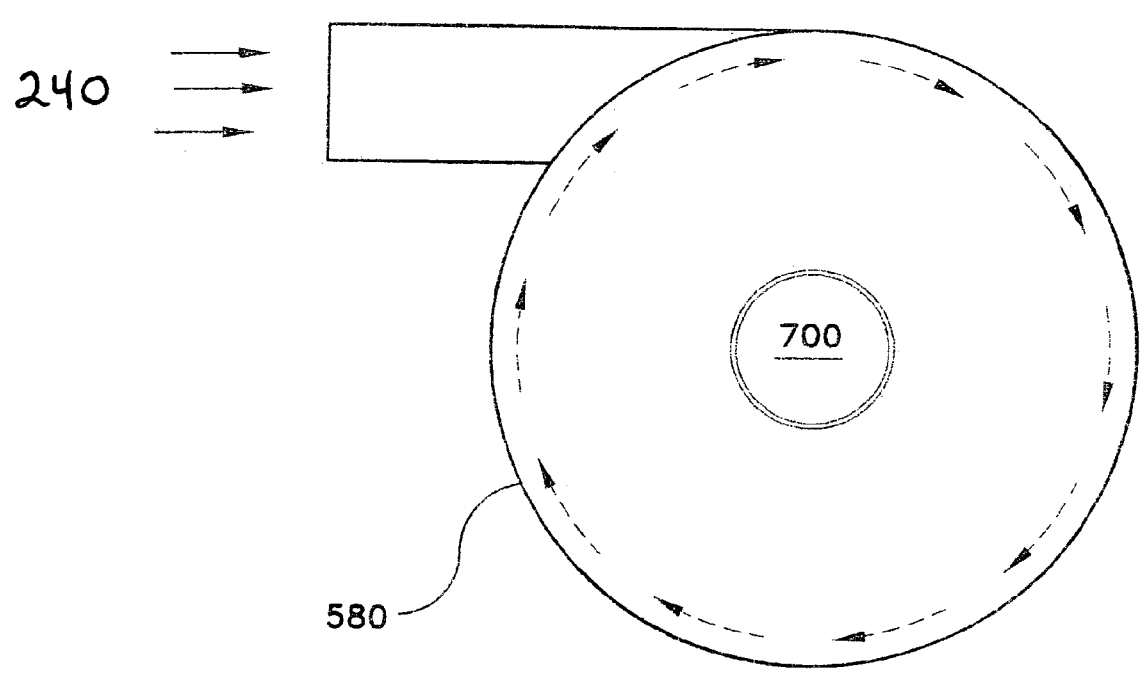
FIG. 11 shows the internal airflow inside a cyclone separator according to the invention.

It should be understood that the air inlet 600*a* is configured to ensure that the airflow 240 is directed tangentially into the cyclone separator 580, as shown in FIG. 11. Tangential flow of air inside the cyclone separator 580 is important because the air 240 is directed against the internal surface 680 where the airflow 240 is further cooled to form water droplets 920, shown in FIG. 8, on the interior surface 680. The water droplets 920 are discharged via water discharge outlet 700. Pollutants that carry over in the airflow 240 also condense out in the water droplets 920 to produce the substantially dehydrated and purified cold airflow 260.

Figure 8:
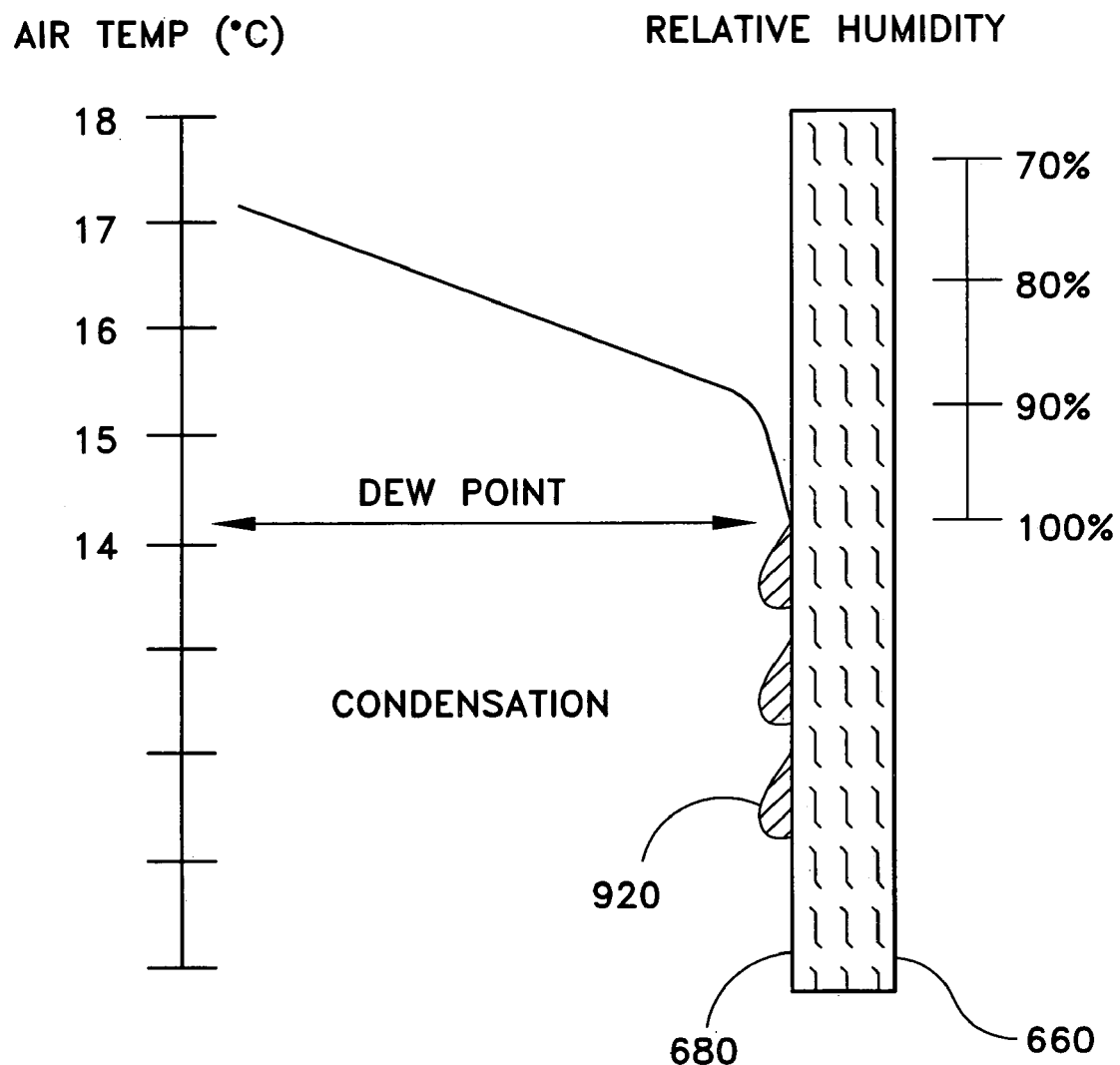
FIG. 8 is a chart showing the formation of water droplets on the internal surface of a cyclone separator according to the invention.

An explanation of condensation, i.e., the formation of water droplets 920 on the internal surface 680, is provided in FIG. 8. Specifically, as air is circulated inside the cyclone separator 580, the air comes into contact with the cooled interior surface 680 where the air is further cooled resulting in the formation of condensation water droplets 920. The water droplets 920 are directed by gravity to the condensed water discharge outlet 700.

Figure 4:
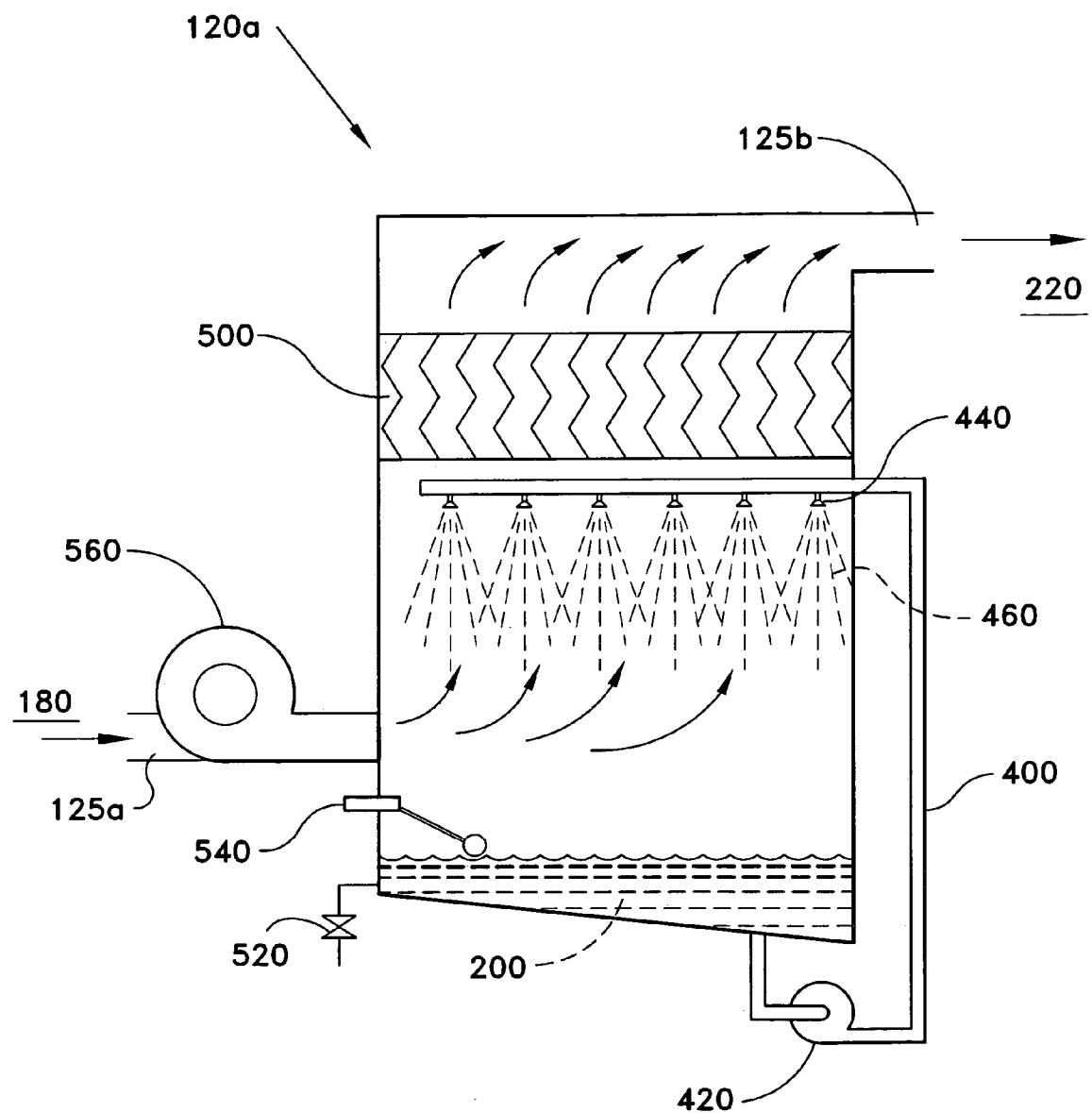
FIG. 4 is a diagrammatic view showing one variant of an air pollutant removal unit according to the invention.

It should be understood that the various sub-systems that make up the air purification system 100 could be substituted for functionally equivalent sub-systems. For example, FIG. 4 shows a variant of the air pollutant removal stage, designated as 120*a*, in which the water collection baffles 500 are arranged above the water spray, and FIGS. 5 and 6 show variants of the air pre-cooler.

Figure 9:
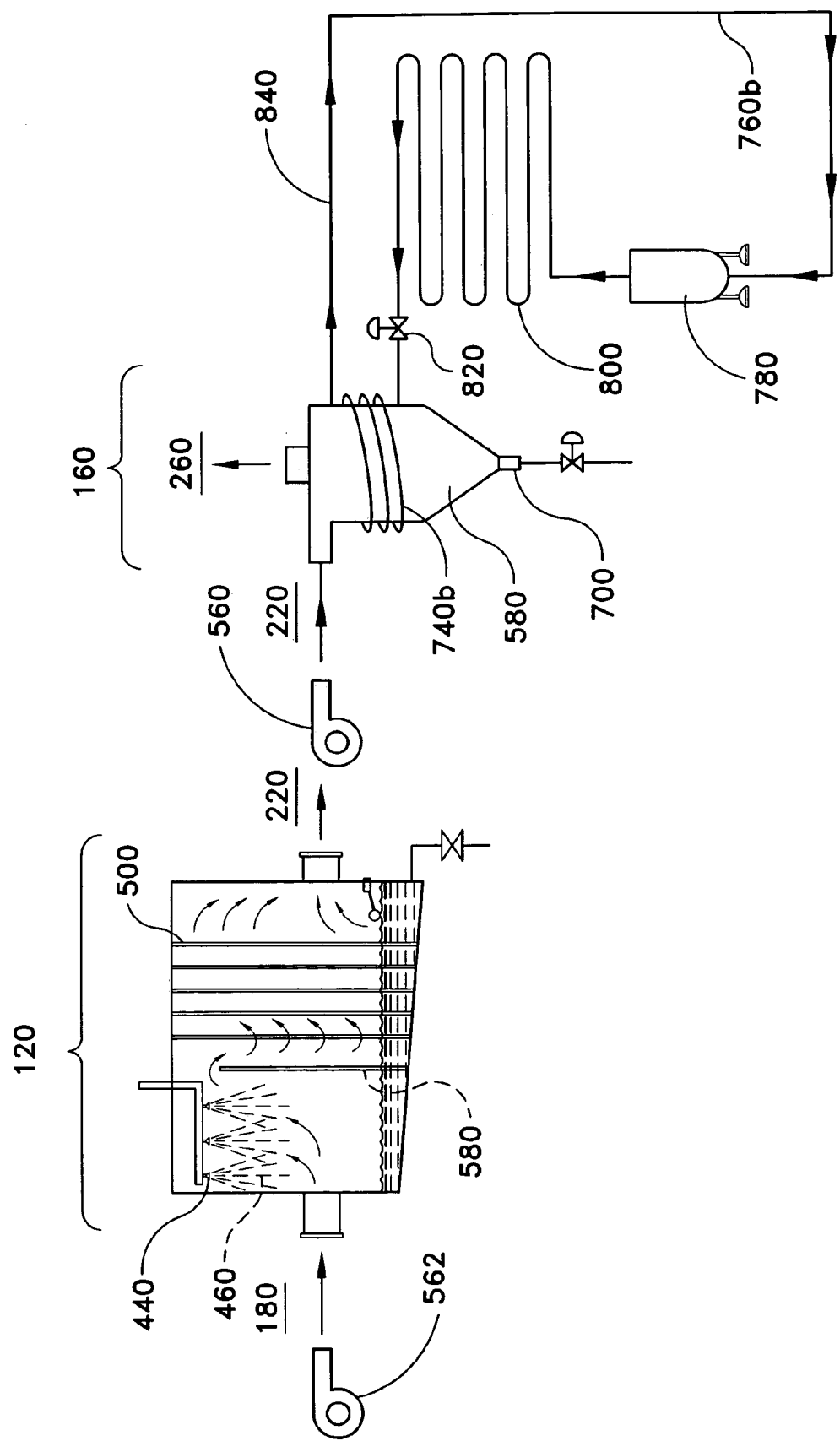
FIG. 9 is a diagrammatic view showing an air purification system with a single cooling coil according to the invention.

The air purification system 100 is preferably operated using a single cooling coil, as shown in FIG. 9, where the integrated cooling system 760*b* comprises a single cooling coil 740*b* to cool the cyclone separator 580, and more particularly to cool the internal cyclone separator surface 680. In this form of operation, the pollutants from an incoming polluted airflow 180 are removed by the air pollutant removal stage 120 to provide a substantially pollutant free outgoing moist airflow 220. The cooled cyclone separator 580 is used to condense water out of the airflow 220 to provide a substantially dehydrated and purified cold airflow 260 suitable for use in a building 280 or other facility, such as a microchip fabrication facility, where dry clean air is desired. Alternatively, a heating coil can be disposed at the air outlet 260 of the cyclone for regulating the air temperature.

It is to be understood that the present invention is not limited to the embodiment described above, but encompasses any and all embodiments within the scope of the following claims.

I claim:

1. An air purification system for cleaning and cooling air, comprising:
   an air pollutant removal unit having an air inlet and an air outlet;
   a cyclone separator having:
     a housing defining an exterior surface and an interior surface;
     a cyclone air inlet opening into the housing, the cyclone air inlet being connected to the air pollutant removal unit air outlet;
     a cyclone air outlet;
     a heating coil disposed at the cyclone air outlet for regulating air temperature; and
     a condensed water discharge outlet; and
   a cyclone separator cooling coil disposed around the cyclone separator housing;
   whereby air passing through the air removal unit has any moisture therein condensed and removed in the cyclone separator, together with any remaining air pollutants.

2. The air purification system according to claim 1, further comprising at least one air blower for directing the air into the air inlet of the air pollutant removal unit.

3. An air purification system for cleaning and cooling air, comprising:
  an air pollutant removal unit having an air inlet and an air outlet, wherein said air pollutant removal unit further comprises a housing defining a chamber having a water recirculation system disposed therein the recirculation system including:
    a water reservoir disposed at a bottom of the chamber for collecting water;
    a water delivery conduit extending into the chamber and having a valve disposed therein adapted for adding water to the reservoir when water in the reservoir drops below a set level;
    a water drain conduit extending from the reservoir and having a water bleed valve therein adapted for draining and sampling the water in the reservoir;
    a plurality of spray heads in the chamber above the reservoir and the air inlet; and
    a water pump and conduit connecting the water pump to the reservoir and the spray heads;
    wherein the water pump circulates water from the reservoir to the spray heads in order to produce a water spray for scrubbing pollutants from the air entering the air inlet;
  a cyclone separator having:
    a housing defining an exterior surface and an interior surface;
    a cyclone air inlet opening into the housing, the cyclone air inlet being connected to the air pollutant removal unit air outlet;
    a cyclone air outlet; and
    a condensed water discharge outlet; and
  a cyclone separator cooling coil disposed around the cyclone separator housing;
  whereby air passing through the air removal unit has any moisture therein condensed and removed in the cyclone separator, together with any remaining air pollutants.

4. The air purification system according to claim 3, wherein the water bleed valve is an automatic valve having a preset timer actuating the valve.

5. The air purification system according to claim 3, further comprising a plurality of water collection baffles mounted above the spray heads.

6. The air purification system according to claim 3, wherein the air pollutant removal unit further comprises:
  an air dam disposed in the chamber between the spray heads and the air outlet; and
  a plurality of baffles disposed between the air dam and the air outlet for condensing and returning water to the reservoir and for scrubbing pollutants from the air in the condensed water.

7. The air purification system according to claim 1, further comprising at least one air blower disposed between the air pollutant removal unit and the cyclone separator for increasing airflow through the cyclone air inlet of the cyclone separator, the cyclone air inlet being configured to direct the air tangentially into the cyclone separator.

8. The air purification system according to claim 7, further comprising an integrated cooling system having:
  a refrigerant compressor unit;
  a condenser in communication with the compressor unit;
  a high pressure refrigerant line in communication with the condenser and said cyclone separator cooling coil;
  a expansion valve in communication with the high pressure refrigerant line;
  an evaporator in communication with the expansion valve; and
  a low pressure refrigerant line in communication with the evaporator and the compressor unit.

9. The air purification system according to claim 1, wherein the cyclone separator further comprises a plurality of air fins attached to the interior surface of the cyclone separator for directing the airflow in a spiral pattern.

10. An air purification system for cleaning and cooling air, comprising:
  an air pollutant removal unit having an air inlet and an air outlet;
  a cyclone separator having:
    a housing defining an exterior surface and an interior surface;
    a cyclone air inlet opening into the housing, the cyclone air inlet being connected to the air pollutant removal unit air outlet;
    a cyclone air outlet; and
    a condensed water discharge outlet;
  a pre-cooler unit disposed between the air pollutant removal unit air outlet and the cyclone air inlet, the pre-cooler unit having a housing and a pre-cooler coil disposed in the housing; and
  a cyclone separator cooling coil disposed around the cyclone separator housing, the cooling coil being in series with the pre-cooler coil.

11. The air purification system according to claim 10, wherein said air pollutant removal unit further comprises a housing defining a chamber having a water recirculation system disposed therein the recirculation system including:
  a water reservoir disposed at a bottom of the chamber for collecting water;
  a water delivery conduit extending into the chamber and having a valve disposed therein adapted for adding water to the reservoir when water in the reservoir drops below a set level;
  a water drain conduit extending from the reservoir and having a water bleed valve therein adapted for draining and sampling the water in the reservoir;
  a plurality of spray heads in the chamber above the reservoir and the air inlet;
  a water pump and conduit connecting the water pump to the reservoir and the spray heads; and
  an air dam disposed between the air inlet and the air outlet;
  wherein the water pump circulates water from the reservoir to the spray heads in order to produce a water spray for scrubbing pollutants from the air entering the air inlet.

12. The air purification system according to claim 10, further comprising:
  at least one air blower in series between the pre-cooler and the cyclone separator, the blower simultaneously pulling the airflow into the pre-cooler while pushing the airflow into the cyclone air inlet of the cyclone separator, the cyclone air inlet being configured to direct the airflow tangentially into the cyclone separator; and
  the cyclone air outlet having a centrally elongated tube partially extending interiorly of the cyclone separator for allowing a substantially purified dry air to egress through the air outlet.

* * * * *